United States Patent
Van De Plas et al.

(10) Patent No.: US 10,995,815 B2
(45) Date of Patent: May 4, 2021

(54) DAMPER WITH FLEXIBLE FLOATING DISC

(71) Applicant: Tenneco Automotive Operating Company Inc., Lake Forest, IL (US)

(72) Inventors: Jelle Van De Plas, Nieuwrode (BE); Ioannis Trikalinos, Leuven (BE); Werner Bosmans, Koersel (BE); Frederic Baldoni, Borgloon (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 189 days.

(21) Appl. No.: 16/145,735

(22) Filed: Sep. 28, 2018

(65) Prior Publication Data

US 2020/0102997 A1    Apr. 2, 2020

(51) Int. Cl.
*F16F 9/512* (2006.01)
*B60G 17/08* (2006.01)
(Continued)

(52) U.S. Cl.
CPC .......... *F16F 9/5126* (2013.01); *B60G 17/056* (2013.01); *B60G 17/08* (2013.01); *F16F 9/3482* (2013.01); *F16F 9/49* (2013.01)

(58) Field of Classification Search
CPC .......... F16F 9/5126; F16F 9/3482; F16F 9/49; B60G 17/08; B60G 17/056
(Continued)

(56) References Cited

U.S. PATENT DOCUMENTS

| | | |
|---|---|---|
| 3,180,453 A | 4/1965 | Murata |
| 3,232,390 A | 2/1966 | Chano |

(Continued)

FOREIGN PATENT DOCUMENTS

| | | |
|---|---|---|
| DE | 102004001743 A1 | 8/2004 |
| EP | 1496285 A2 | 1/2005 |

(Continued)

OTHER PUBLICATIONS

Translation of Japanese Patent No. JP 2011202789 obtained from website: https://worldwide.espacenet.com on Aug. 5, 2020.*

(Continued)

*Primary Examiner* — Pamela Rodriguez
(74) *Attorney, Agent, or Firm* — Harness, Dickey & Pierce, P.L.C.

(57) ABSTRACT

A damper system for a vehicle including a pressure tube, piston assembly, and stroke dependent damper assembly. The stroke dependent damper assembly is coupled to a piston rod at a position below the piston assembly. The stroke dependent damper assembly includes a disc chamber that slidably receives a flexible floating disc. The disc chamber has proximal and distal chamber surfaces, which can include holes. The flexible floating disc is moveable between a first position where it contacts the proximal chamber surface and a second position where it contacts the distal chamber surface. The proximal chamber surface defines a proximal tapered cavity and the distal chamber surface defines a distal tapered cavity. The flexible floating disc is resilient and can flex into the proximal tapered cavity or the distal tapered cavity when it makes contact with the proximal chamber surface or the distal chamber surface.

21 Claims, 9 Drawing Sheets

(51) Int. Cl.
*F16F 9/348* (2006.01)
*B60G 17/056* (2006.01)
*F16F 9/49* (2006.01)

(58) Field of Classification Search
USPC ...... 188/282.6, 282.5, 282.9, 313, 316, 317, 188/322.15, 322.22; 267/64.11, 64.13, 267/64.15
See application file for complete search history.

(56) References Cited

U.S. PATENT DOCUMENTS

| | | | |
|---|---|---|---|
| 3,379,286 | A | 4/1968 | Takagi |
| 3,570,635 | A | 3/1971 | Takagi |
| 4,765,446 | A | 8/1988 | Murate et al. |
| 4,874,066 | A | 10/1989 | Silberstein |
| 4,953,671 | A | 9/1990 | Imaizumi |
| 5,058,715 | A | 10/1991 | Silberstein |
| 5,248,014 | A | 9/1993 | Ashiba |
| 5,505,225 | A | 4/1996 | Niakan |
| 6,220,409 | B1 | 4/2001 | Deferme |
| 6,918,473 | B2 | 7/2005 | Deferme |
| 7,100,750 | B2 | 9/2006 | Drees |
| 8,590,677 | B2 | 11/2013 | Kim |
| 8,651,252 | B2 | 2/2014 | Katayama et al. |
| 8,695,766 | B2 | 4/2014 | Yamashita et al. |
| 8,833,532 | B2 | 9/2014 | Yamashita |
| 8,844,687 | B2 | 9/2014 | Yu et al. |
| 9,239,092 | B2 | 1/2016 | Nowaczyk et al. |
| 9,291,231 | B2 | 3/2016 | Kim et al. |
| 9,541,153 | B2 | 1/2017 | Park |
| 2007/0209892 | A1 | 9/2007 | Masamura |
| 2009/0057079 | A1* | 3/2009 | Vanbrabant ........... F16F 9/3488 188/313 |
| 2015/0144444 | A1 | 5/2015 | Lim |
| 2016/0025180 | A1 | 1/2016 | Fukushima et al. |
| 2016/0288604 | A1 | 10/2016 | Teraoka et al. |
| 2016/0288605 | A1 | 10/2016 | Teraoka et al. |

FOREIGN PATENT DOCUMENTS

| | | |
|---|---|---|
| EP | 1788276 A2 | 5/2007 |
| JP | 2011202789 A | 10/2011 |
| JP | 5851159 B2 | 2/2016 |
| JP | 5981800 B2 | 8/2016 |
| KR | 1998-0038156 U | 9/1998 |
| KR | 101272755 B1 | 6/2013 |
| WO | 2015082147 A1 | 6/2015 |
| WO | 2017125478 A1 | 7/2017 |
| WO | WO-2018168865 A1 | 9/2018 |

OTHER PUBLICATIONS

International Search Report received in related PCT Application No. PCT/US2019/053652 dated Jan. 16, 2020.

Written Opinion received in related PCT application No. PCT/US2019/053652 dated Jan. 16, 2020.

* cited by examiner

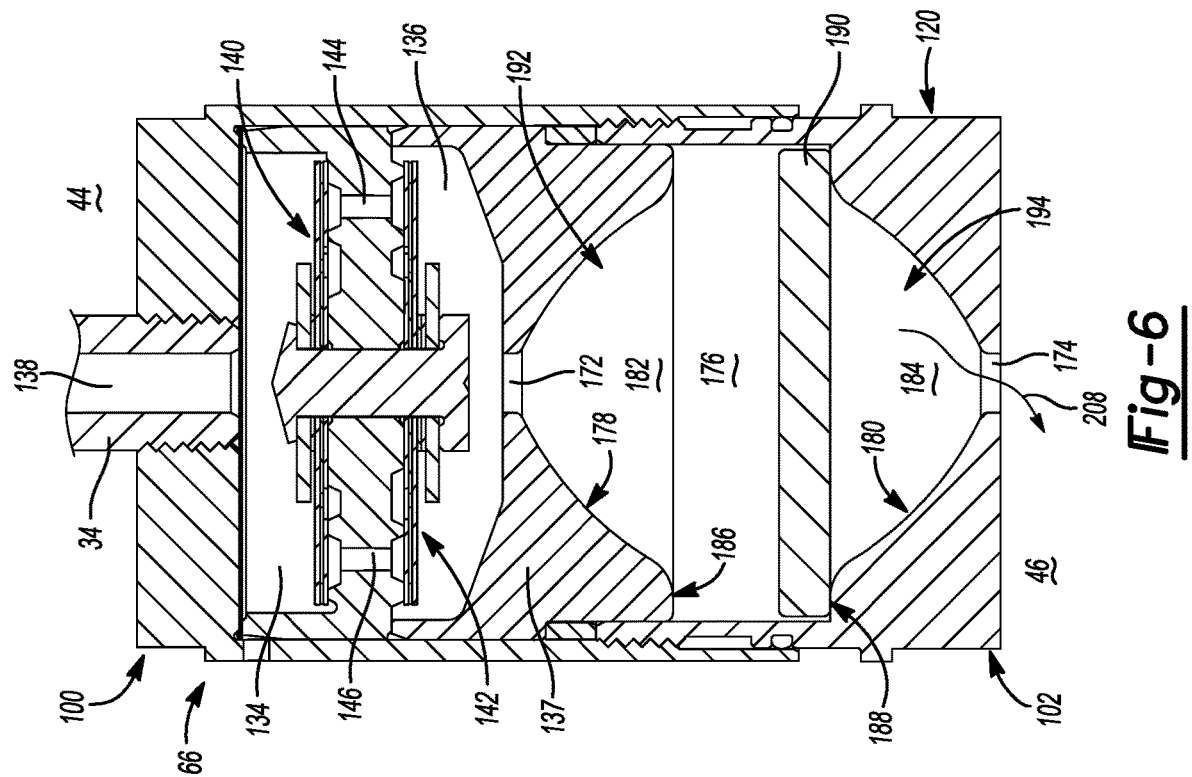
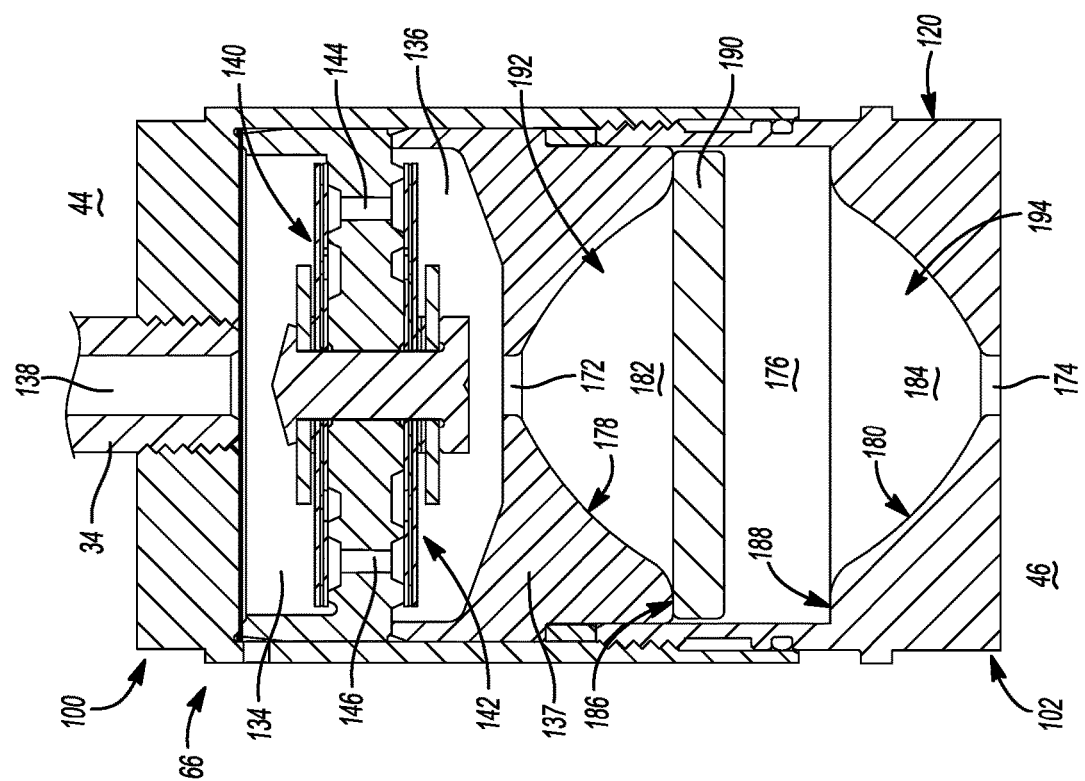

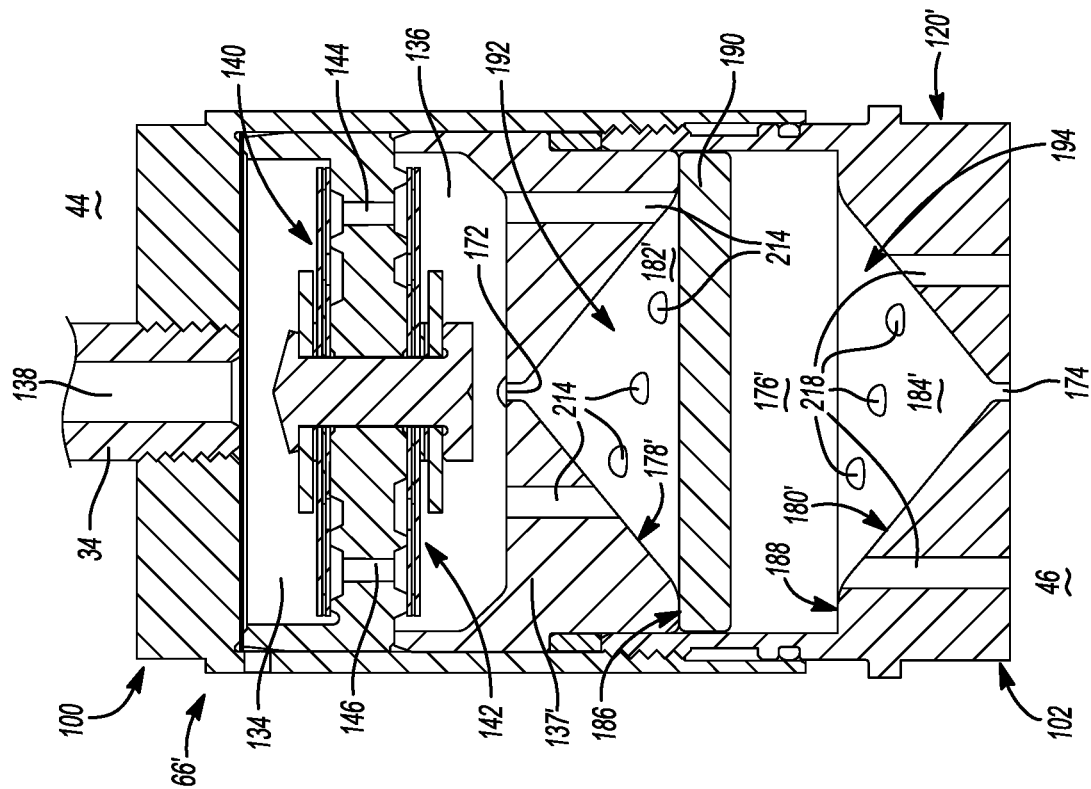
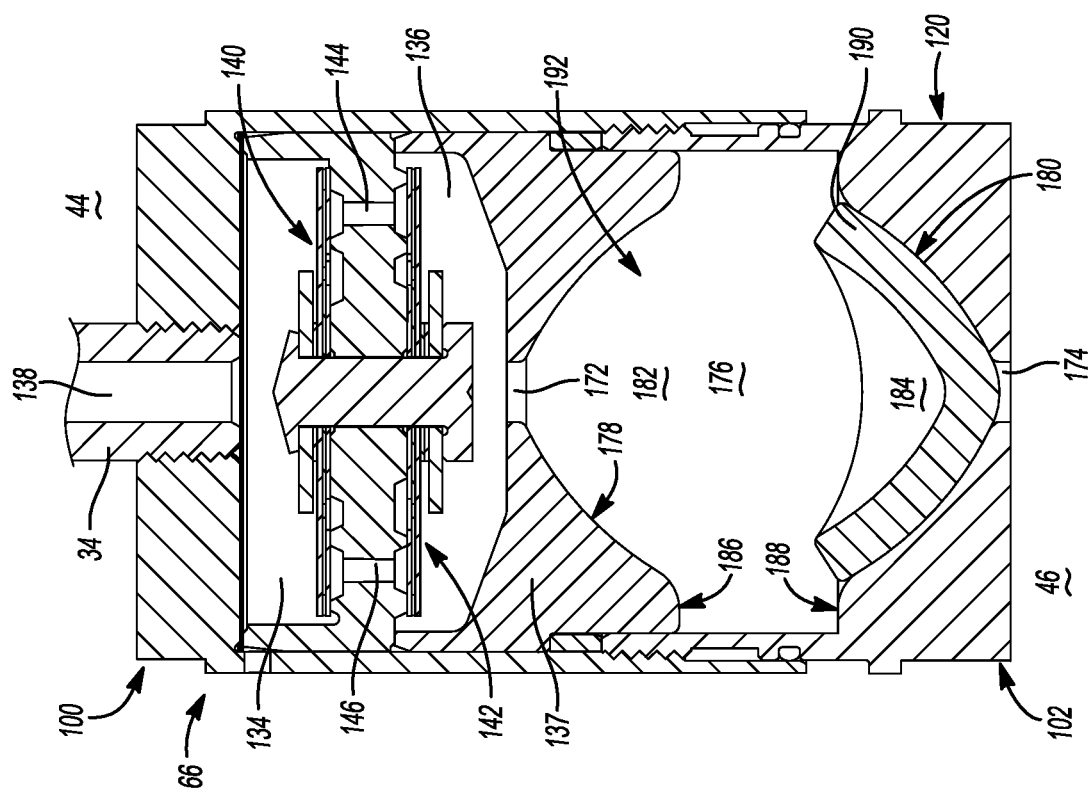

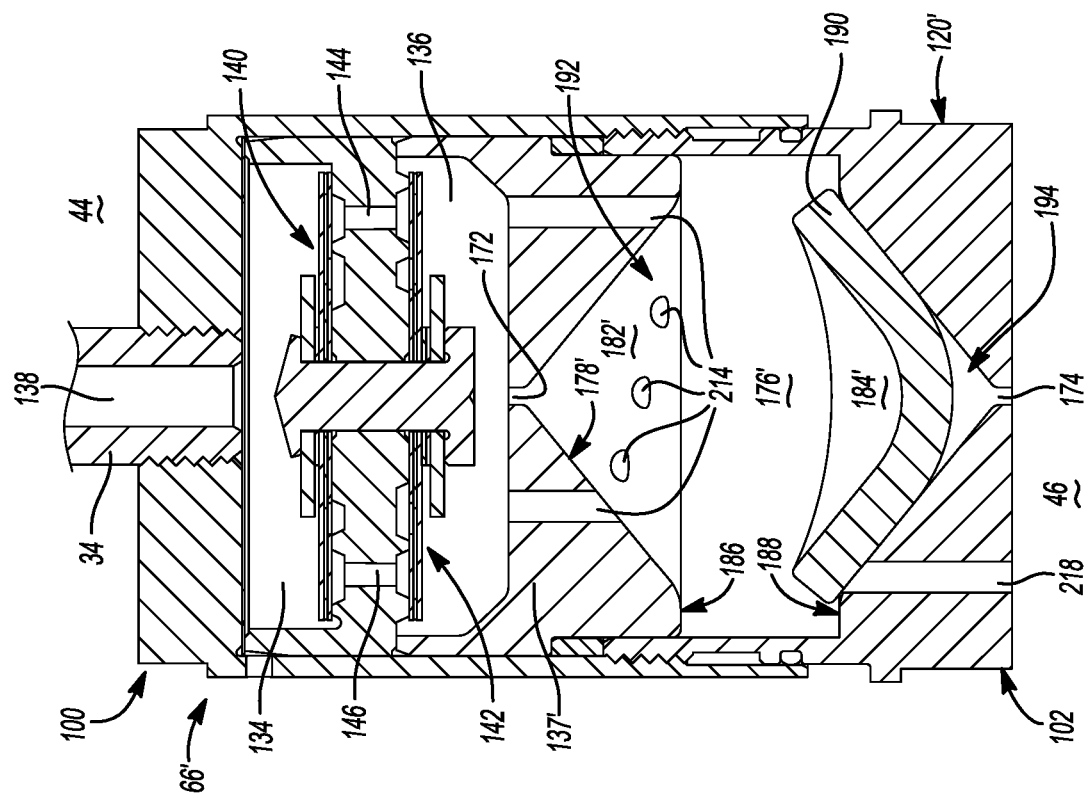
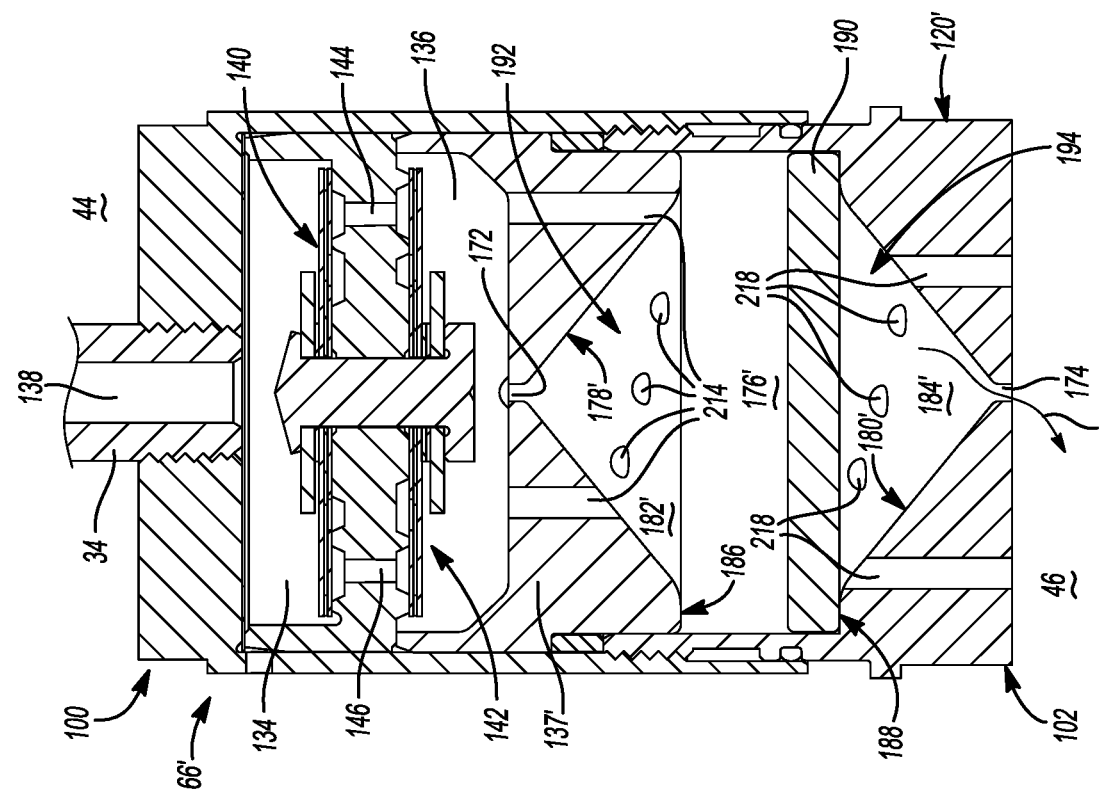

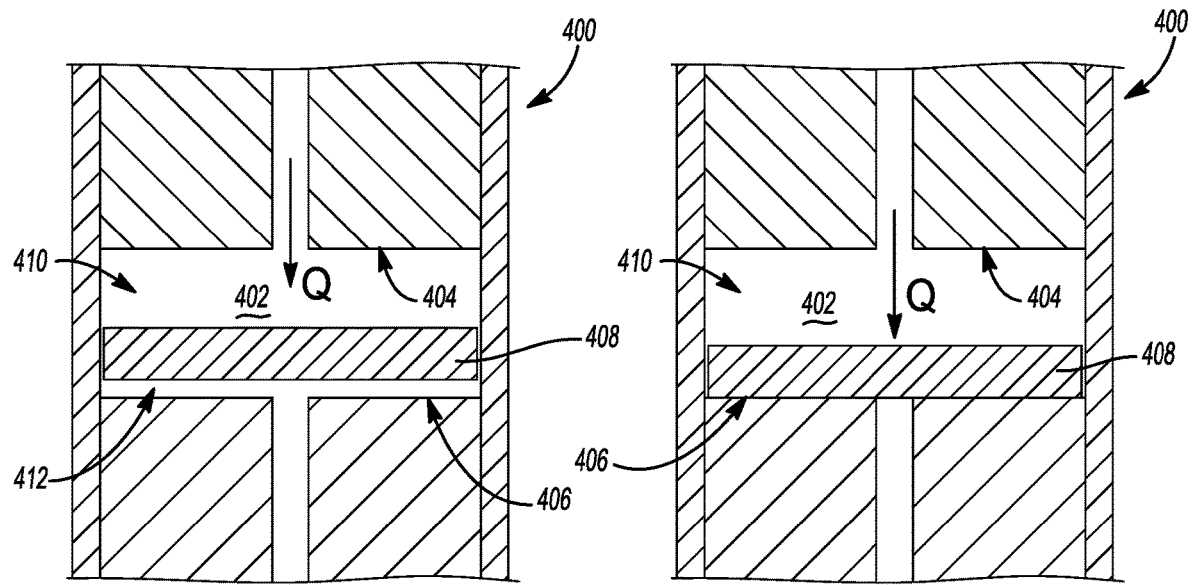
*Fig-14*  *Fig-15*
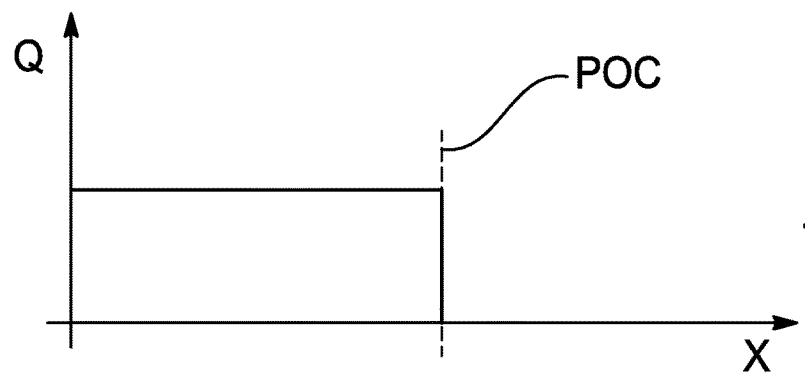
*Fig-16*
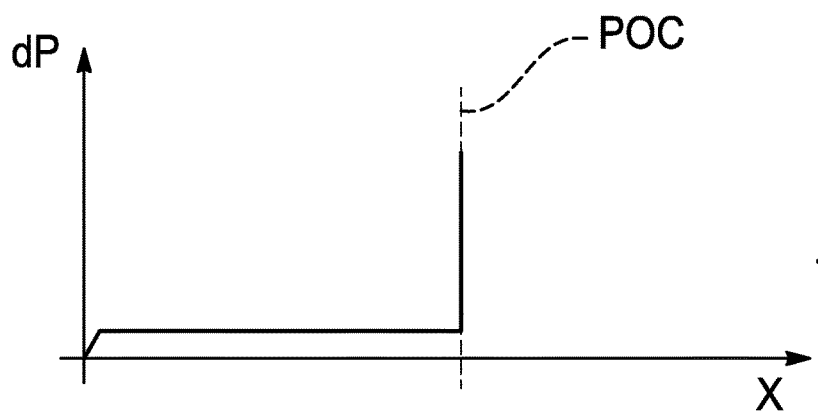
*Fig-17*

DAMPER WITH FLEXIBLE FLOATING DISC

FIELD

The present disclosure relates to automotive shock absorbers/dampers. More particularly, the present disclosure relates to shock absorbers/dampers that provide a different magnitude of damping based on a length of a stroke of the shock absorber/damper.

BACKGROUND

The statements in this section merely provide background information related to the present disclosure and may not constitute prior art.

Shock absorbers are typically used in conjunction with automotive suspension systems or other suspension systems to absorb unwanted vibrations that occur during movement of the suspension system. In order to absorb these unwanted vibrations, automotive shock absorbers are generally connected between the sprung (body) and the unsprung (suspension/drivetrain) masses of the vehicle.

In typical shock absorbers, a piston is located within a fluid chamber defined by a pressure tube and is connected to the sprung mass of the vehicle through a piston rod. The pressure tube is connected to the unsprung mass of the vehicle. The piston divides the fluid chamber of the pressure tube into an upper working chamber and a lower working chamber. The piston includes compression valving that limits the flow of hydraulic fluid from the lower working chamber to the upper working chamber during a compression stroke. The piston also includes rebound valving that limits the flow of hydraulic fluid from the upper working chamber to the lower working chamber during a rebound or extension stroke. By controlling the fluid flow between the two working chambers, a pressure drop is built up between the two working chambers. Because the compression valving and the rebound valving each has the ability to limit the flow of hydraulic fluid, the shock absorber is able to produce damping forces that counteract oscillations/vibrations, which would otherwise be transmitted from the unsprung mass to the sprung mass.

Typical shock absorbers provide the same magnitude of damping force regardless of the length of a damper stroke. However, shock absorbers have been developed where the magnitude of the damping force generated by the shock absorber during smaller damper strokes is different from the magnitude of the damping force generated by the shock absorber during larger damper strokes. These multi-force shock absorbers provide a relatively small or low damping force during the normal running of the vehicle and a relatively large or high damping force during maneuvers requiring extended suspension movements. The normal running of the vehicle is accompanied by small or fine vibrations of the un-sprung mass of the vehicle and thus the need for a soft ride or low damping characteristic of the suspension system to isolate the sprung mass from these small or fine vibrations. During a turning or braking maneuver, as an example, the sprung mass of the vehicle will attempt to undergo a relatively slow and/or large vibration, which then requires a firm ride or high damping characteristic of the suspension system to support the sprung mass and provide stable handling characteristics to the vehicle. Thus, these multi-force shock absorbers offer the advantage of a smooth steady state ride by eliminating the high frequency/small excitations from the sprung mass, while still providing the necessary damping or firm ride for the suspension system during vehicle maneuvers causing larger excitations of the sprung mass.

One such multi-force shock absorber is disclosed in U.S. Pat. No. 6,220,409, which is also assigned to Tenneco Automotive Inc. This shock absorber provides two stages of damping (hard and soft) by utilizing a stroke dependent damper assembly that is mounted to the piston rod below the main piston assembly. The stroke dependent damper assembly includes a piston that is longitudinally moveable between two rubber travel stops. These resilient travel stops act as mechanical stops for the piston when the piston reaches its travel extremes. When the piston hits one of these resilient travel stops, especially during a rebound stroke, a pressure wave can be created in the hydraulic fluid of the shock absorber that can vibrate the piston rod and cause noise.

Accordingly, there remains a need in the marketplace for stroke dependent shock absorbers with improved noise, vibration, and harshness.

SUMMARY

This section provides a general summary of the disclosure, and is not a comprehensive disclosure of its full scope or all of its features.

In accordance with one aspect of the subject disclosure, a damper system for a vehicle is provided. The damper system includes a pressure tube and a first piston assembly that is slidably fitted in the pressure tube. A piston rod extends within the pressure tube along a longitudinal axis and the first piston assembly is coupled to the piston rod. The pressure tube contains a hydraulic fluid and the first piston assembly separates the pressure tube into a first working chamber and a second working chamber. The first piston assembly includes a first valve assembly. The first valve assembly operates to control flow of the hydraulic fluid between the first working chamber and the second working chamber.

The damper system also includes a stroke dependent damper assembly. The stroke dependent damper assembly includes a damper housing, a disc chamber, and a flexible floating disc that is slidably received in the disc chamber. The damper housing is coupled to the piston rod at the proximal end of the stroke dependent damper assembly. The disc chamber is bounded by a proximal chamber surface and a distal chamber surface. The flexible floating disc is unbiased and free floating in the disc chamber and is moveable along the longitudinal axis between a first position where the flexible floating disc contacts the proximal chamber surface of the disc chamber and a second position where the flexible floating disc contacts the distal chamber surface of the disc chamber. The proximal chamber surface defines a proximal tapered cavity and the distal chamber surface defines a distal tapered cavity. The flexible floating disc is made of a resilient material such that the flexible floating disc is adapted to flex into the proximal tapered cavity when the flexible floating disc makes contact with the proximal chamber surface in the first position and is adapted to flex into the distal tapered cavity when the flexible floating disc makes contact with the distal chamber surface in the second position.

In operation, the flexible floating disc remains spaced from the proximal and distal chamber walls during smaller damper strokes. When the flexible floating disc is in this position, fluid flows freely into and out of the disc chamber in the stroke dependent damper assembly. As a result, the damping is low during smaller damper strokes for improved ride comfort. During larger damper strokes, fluid flow in the disc chamber of the stroke dependent damper assembly pushes the flexible floating disc towards the first position or the second position. When the flexible floating disc reaches these positions, the flexible floating disc contacts the proximal chamber surface or the distal chamber surface and begins to flex into the proximal tapered cavity or the distal tapered cavity. As a result, the amount of damping progressively increases as the floating piston approaches the first and second positions.

The flexibility of the flexible floating disc reduces pressure waves inside the damper system that would otherwise be generated when the flexible floating disc hits the proximal and distal chamber surfaces at the first and second positions. The work needed to deflect (i.e., bend) the flexible floating disc into the proximal and distal tapered cavities dissipates energy and reduces the magnitude of the pressure wave. In other words, the transition from a moving flexible floating disc to a stopped flexible floating disc is much smoother due to the extra fluid volume that is displaced when the flexible floating disc flexes into the proximal and distal tapered cavities in the disc chamber. Noise, vibration, and harshness is therefore improved because pressure waves inside the damper system, which can vibrate the piston rod, are reduced.

In accordance with another aspect of the subject disclosure, the stroke dependent damper assembly includes a disc chamber that has a plurality of holes plurality of holes for communicating fluid into and out of the disc chamber. The plurality of holes in the disc chamber are arranged at a plurality of different longitudinal positions such that the flexible floating disc sequentially closes off the holes in the disc chamber as the flexible floating disc approaches the first and second positions. This restricts fluid flow into and out of the disc chamber and slows down the longitudinal movement of the flexible floating disc. Because the speed of the flexible floating disc is hydraulically controlled to slow down gradually as the flexible floating disc approaches the first and second positions, a "soft, hydraulic stop" for the flexible floating disc is created. This reduces pressure waves inside the damper system that would otherwise be generated when the flexible floating disc hits the proximal and distal chamber surfaces at the first and second positions. Noise, vibration, and harshness is therefore improved because pressure waves inside the damper system, which can vibrate the piston rod, are reduced.

In addition, because the plurality of holes dissipate energy and slow down the longitudinal movement of the flexible floating disc, the flexible floating disc can be given less room to flex/deflect. As a result, the proximal and distal tapered cavities can be made shallower, which decreases the overall length of the stroke dependent damper assembly. This is particularly advantageous, because the length of internal shock absorber components, such as the stroke dependent damper assembly, limits the travel distance of the shock absorber. By reducing the overall length of the stroke dependent damper assembly, travel length can be increased in a shock absorber of any given length.

Further areas of applicability and advantages will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 5 is a side cross-sectional view depicting the piston assembly and stroke dependent damper assembly of the shock absorber shown in FIG. 3 where the stroke dependent damper assembly includes a flexible floating disc that is illustrated abutting a proximal travel stop;

FIG. 6 is another side cross-sectional view depicting the piston assembly and stroke dependent damper assembly of the shock absorber shown in FIG. 3 where the flexible floating disc of the stroke dependent damper assembly is illustrated abutting a distal travel stop;

FIG. 7 is another side cross-sectional view depicting the piston assembly and stroke dependent damper assembly of the shock absorber shown in FIG. 3 where the flexible floating disc of the stroke dependent damper assembly is illustrated flexing into a concave tapered depression in a distal end of the stroke dependent damper assembly;

FIG. 8 is a side cross-sectional view depicting the piston assembly and stroke dependent damper assembly of the shock absorber shown in FIG. 4 where the stroke dependent damper assembly includes a flexible floating disc that is illustrated abutting a proximal travel stop;

FIG. 9 is another side cross-sectional view depicting the piston assembly and stroke dependent damper assembly of the shock absorber shown in FIG. 4 where the flexible floating disc of the stroke dependent damper assembly is illustrated abutting a distal travel stop;

FIG. 10 is another side cross-sectional view depicting the piston assembly and stroke dependent damper assembly of the shock absorber shown in FIG. 4 where the flexible floating disc of the stroke dependent damper assembly is illustrated flexing into a conical tapered depression in a distal end of the stroke dependent damper assembly;

FIG. 14 is a side cross-sectional view depicting the piston assembly of the shock absorber shown in FIG. 2 and the stroke dependent damper assembly shown in FIG. 13 where the floating piston of the stroke dependent damper assembly is illustrated in an intermediate position between the proximal planar wall and a distal planar wall of the stroke dependent damper assembly;

FIG. 15 is a side cross-sectional view depicting the piston assembly of the shock absorber shown in FIG. 2 and the stroke dependent damper assembly shown in FIG. 13 where the floating piston of the stroke dependent damper assembly is illustrated abutting the distal planar wall of the stroke dependent damper assembly;

FIG. 16 is a plot illustrating fluid flowrate through the stroke dependent damper assembly shown in FIG. 13 versus position of the floating piston; and FIG. 17 is a plot illustrating pressure difference across the floating piston shown in FIG. 13 versus the position of the floating piston.

Corresponding reference numerals indicate corresponding parts throughout the several views of the drawings.

DETAILED DESCRIPTION

Figure 1:
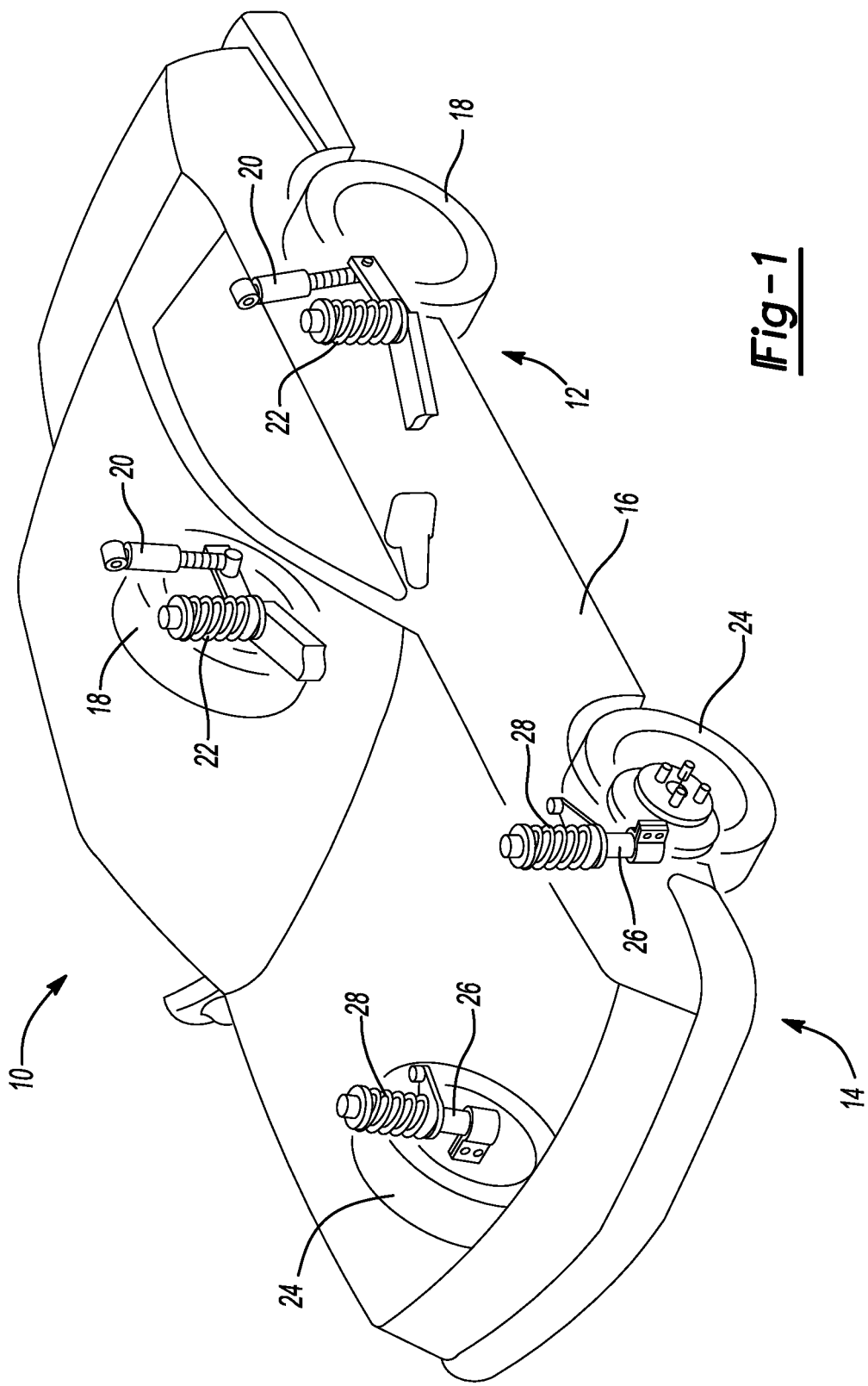
FIG. 1 is an illustration of an exemplary vehicle equipped with four shock absorbers constructed in accordance with the teachings of the present disclosure.

The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, a vehicle 10 including a rear suspension 12, a front suspension 14, and a body 16 is illustrated. The rear suspension 12 has a transversely extending rear axle assembly (not shown) adapted to operatively support the vehicle's rear wheels 18. The rear axle assembly is operatively connected to the body 16 by a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by a second pair of shock absorbers 26 and by a pair of helical coil springs 28. Shock absorbers 20 and 26 serve to dampen the relative motion of the unsprung portion (i.e., front and rear suspensions 14 and 12, respectively) and the sprung portion (i.e., body 16) of vehicle 10. While the vehicle 10 has been depicted as a passenger car having front and rear axle assemblies, shock absorbers 20 and 26 may be used with other types of vehicles or machinery, or in other types of applications such as vehicles incorporating independent front and/or independent rear suspension systems. Further, the term "shock absorber" as used herein is meant to refer to shock absorbers and shock absorber systems in general and thus will include MacPherson struts. It should also be appreciated that the scope of the subject disclosure is intended to include shock absorber systems for stand-alone shock absorbers 20 and coil-over shock absorbers 26.

Figure 2:
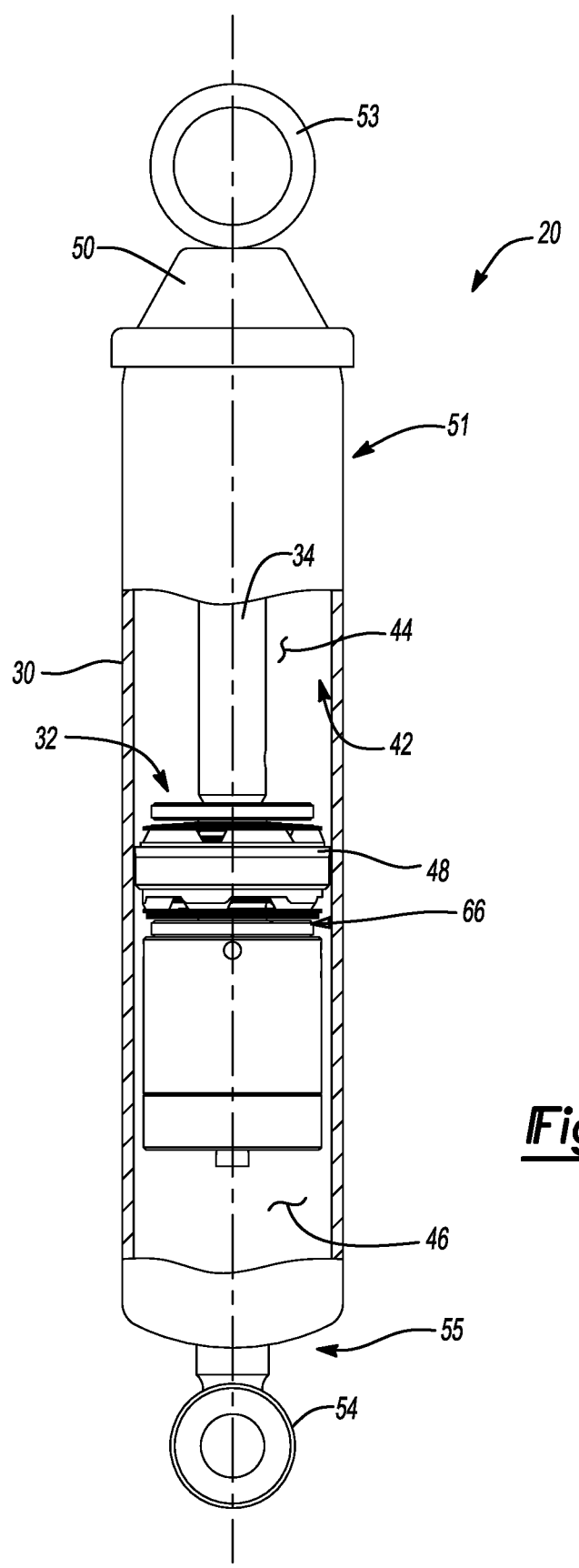
FIG. 2 is a side section view of a shock absorber constructed in accordance with the teachings of the present disclosure.

With additional reference to FIG. 2, shock absorber 20 is shown in greater detail. Shock absorber 20 comprises a pressure tube 30, a first piston assembly 32, and a piston rod 34. The pressure tube 30 and the piston rod 34 extend co-axially along a longitudinal axis 35. Pressure tube 30 defines an inner cavity 42. The first piston assembly 32 is slidably disposed within the inner cavity 42 of the pressure tube 30 and divides the inner cavity 42 into a first working chamber 44 and a second working chamber 46. A seal 48 is disposed between the first piston assembly 32 and pressure tube 30 to permit sliding movement of the first piston assembly 32 with respect to pressure tube 30 without generating undue frictional forces as well as sealing the first working chamber 44 from the second working chamber 46.

Piston rod 34 is attached to the first piston assembly 32 and extends through the first working chamber 44 and through an upper end cap 50 which closes a first end 51 of the pressure tube 30. An attachment end 53 of piston rod 34 opposite to first piston assembly 32 is connected to the body 16 of the vehicle 10 (i.e., the sprung portion of vehicle 10). Pressure tube 30 is filled with a hydraulic fluid and includes an attachment fitting 54 at a second end 55 of the pressure tube 30 that is connected to the unsprung portion of the suspension 12 and 14. The first working chamber 44 is thus positioned between the first end 51 of the pressure tube 30 and the first piston assembly 32 and the second working chamber 46 is positioned between the second end 55 of the pressure tube 30 and the first piston assembly 32. Suspension movements of the vehicle 10 will cause extension/rebound or compression movements of first piston assembly 32 with respect to pressure tube 30. Valving within first piston assembly 32 controls the movement of hydraulic fluid between the first working chamber 44 and the second working chamber 46 during movement of the first piston assembly 32 within pressure tube 30. Optionally, the shock absorber 20 may include a gas chamber defined by a floating piston (not shown) positioned in the pressure tube 30 to compensate for volume changes inside the first working chamber 44 as a result of the volume of the piston rod 34 that is inserted or taken out of the first working chamber 44 due to movements of the piston rod 34 during compression and rebound strokes of the shock absorber 20.

It should be appreciated that the shock absorber 20 may be installed in a reverse orientation, where the attachment end 53 of the piston rod 34 is connected to the unsprung portion of the suspension 12 and 14 and the attachment fitting 54 is connected to the body 16 (i.e., the sprung portion of vehicle 10). While FIG. 2 shows only shock absorber 20, it is to be understood that shock absorber 26 only differs from shock absorber 20 in the way in which it is adapted to be connected to the sprung and unsprung portions of vehicle 10 and the mounting location of the coil spring 28 relative to the shock absorber 26.

Figure 3:
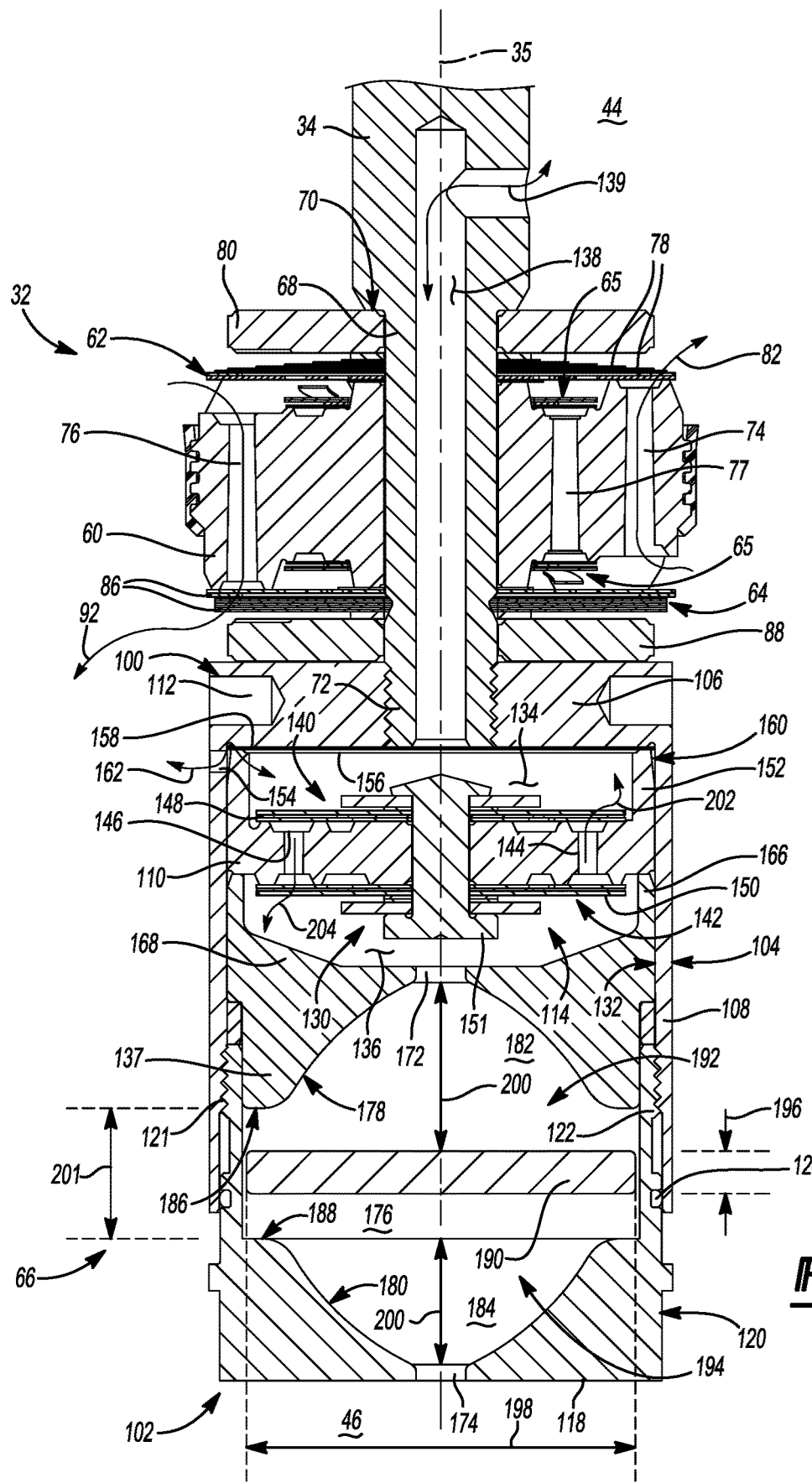
FIG. 3 is a side cross-sectional view depicting the piston assembly and stroke dependent damper assembly of the shock absorber shown in FIG. 2.

With additional reference to FIG. 3, the first piston assembly 32 comprises a piston body 60 that is attached to piston rod 34, a compression valve 62, a rebound valve 64, and one or more bleed valves 65. The shock absorber 20 also includes a stroke dependent damper assembly 66 that is mounted to the piston rod 34. Piston rod 34 includes a reduced diameter section 68 located on the end of the piston rod 34 that is disposed within pressure tube 30 such that the reduced diameter section 68 forms a shoulder 70 that abuts the first piston assembly 32. Piston body 60 is located on reduced diameter section 68 with the compression valve 62 located longitudinally between piston body 60 and shoulder 70 and the rebound valve 64 located longitudinally between piston body 60 and a threaded end 72 of the piston rod 34. Piston body 60 defines one or more compression flow passages 74, one or more rebound flow passages 76, and one or more bleed flow passages 77. In the illustrated example, the bleed flow passages 77 extend longitudinally through the piston body 60 at positions located radially inward of the compression flow passages 74 and the rebound flow passages 76. The compression valve 62 operates to control fluid flow of the hydraulic fluid through the compression flow passages 74 in the piston body 60, the rebound valve 64 operates to control fluid flow of the hydraulic fluid through the rebound flow passages 76 in the piston body 60, and the bleed valves 65 operate to control fluid flow of the hydraulic fluid through the bleed flow passages 77 in the piston body 60. Therefore, the compression, rebound, and bleed valves 62, 64, 65 control fluid flow between the first and second working chambers 44, 46 and thus cooperate to form a first valve assembly 62, 64, 65.

Compression valve 62 comprises a plurality of compression valve plates 78 and a first support washer 80. The compression valve plates 78 are disposed adjacent to piston body 60 to close the compression flow passages 74. During a compression stroke of shock absorber 20, fluid pressure builds up in the second working chamber 46 until the fluid pressure applied to the compression valve plates 78, through the compression flow passages 74, overcomes the load required to deflect the plurality of compression valve plates 78. The compression valve plates 78 elastically deflect to open the compression flow passages 74 and allow the hydraulic fluid to flow from the second working chamber 46 to the first working chamber 44 as shown by arrow 82 in FIG. 3. The first support washer 80 is disposed between the compression valve plates 78 and the shoulder 70 to limit the deflection of the compression valve plates 78.

Rebound valve 64 comprises a plurality of rebound valve plates 86 and a second support washer 88. The rebound valve plates 86 are disposed adjacent to piston body 60 to close the rebound flow passages 76. During an extension or rebound stroke of the shock absorber 20, fluid pressure builds up in the first working chamber 44 until the fluid pressure applied to the rebound valve plates 86, through the rebound flow passages 76, overcomes the load required to deflect rebound valve plates 86. The plurality of rebound valve plates 86 elastically deflect thereby opening the rebound flow passages 76 to allow the hydraulic fluid to flow from the first working chamber 44 to the second working chamber 46 as shown by arrow 92 in FIG. 3. The support washer 88 is positioned longitudinally between the frequency dependent damper assembly 66 and the plurality of rebound valve plates 86 to limit the deflection of the rebound valve plates 86. The support washer 88 extends annularly about the reduced diameter section 68 of the piston rod 34. Therefore, the plurality of rebound valve plates 86 are clamped between the support washer 88 and the piston body 60 when the stroke dependent damper assembly 66 is threaded onto the threaded end 72 of the piston rod 34.

The entire stroke dependent damper assembly 66 translates with the first piston assembly 32 along the longitudinal axis 35 during rebound/extension and compression movements of the piston rod 34 because the first piston assembly 32 and the stroke dependent damper assembly 66 are both fixed to piston rod 34 after assembly. The stroke dependent damper assembly 66 has a smaller outer diameter than the first piston assembly 32. As a result, the stroke dependent damper assembly 66 is spaced radially inward of and does not seal against the pressure tube 30.

The stroke dependent damper assembly 66 extends longitudinally between a proximal end 100 and a distal end 102. Accordingly, the distal end 102 is positioned opposite the proximal end 100. The stroke dependent damper assembly 66 includes a damper housing 104 having a base portion 106 and an extension portion 108. The base portion 106 of the damper housing 104 extends radially inwardly from the extension portion 108 and is coupled to the piston rod 34 at the distal end 102 of the stroke dependent damper assembly 66. Optionally, the damper housing 104 may include a tool interface 112 to facilitate the assembly operation of threading the damper housing 104 onto the threaded end 72 of the piston rod 34.

The stroke dependent damper assembly 66 includes an internal cavity 114 that is defined within the damper housing 104. The distal end 102 of the stroke dependent damper assembly 66 has an end wall 118 that is fixed in place relative to the damper housing 104. In other words, the end wall 118 does not move longitudinally relative to the damper housing 104 after the stroke dependent damper assembly 66 is assembled. The end wall 118 is positioned in direct contact with the hydraulic fluid in the second working chamber 46 and forms part of an outer boundary of the stroke dependent damper assembly 66. Although other configurations are possible, in the illustrated example, the end wall 118 is part of an end cap 120 that is coupled to the damper housing 104.

The end cap 120 may be coupled to the damper housing 104 in a number of different ways, including, without limitation, by a threaded connection 121 or spot welding. In the configuration where the end cap 120 is coupled to the damper housing 104 using threaded connection 121, the longitudinal distance between the end wall 118 and the base portion 106 of the damper housing 104 can be adjusted/ tuned (i.e., increased or decreased) by rotating the end cap 120 relative to the damper housing 104 to set a desired longitudinal distance during assembly.

Although material selection for the various components of the stroke dependent damper assembly 66 may vary, the damper housing 104 and the end cap 120 may be made of a metal such as steel. In the illustrated embodiment, the end cap 120 includes an annular wall 122 that overlaps with and is radially inward of the extension portion 108 of the damper housing 104. A seal 124 is positioned between extension portion 108 of the damper housing 104 and the annular wall 122 of the end cap 120 to create a fluid-tight fit.

The stroke dependent damper assembly 66 includes a second or internal piston assembly 130 positioned inside the damper housing 104. The second piston assembly 130 includes a piston 110 that is positioned inside the internal cavity 114 of the stroke dependent damper assembly 66. The piston 110 of the internal piston assembly 130 slides longitudinally along an inner face 132 of the extension portion 108 of the damper housing 104. A proximal chamber 134 is defined in the internal cavity 114 of the stroke dependent damper assembly 66 longitudinally between the second piston assembly 130 and the proximal end 100 of the stroke dependent damper assembly 66. An intermediary chamber 136 is also defined in the internal cavity 114 of the stroke dependent damper assembly 66 longitudinally between the second piston assembly 130 and a piston retainer 137 that extends longitudinally between the piston 110 of the internal assembly 130 and the end cap 120.

The piston rod 34 includes a rod passage 138 extending between the first working chamber 44 and the proximal chamber 134. As a result, hydraulic fluid is free to flow through the piston rod 34 between the first working chamber 44 of the shock absorber 20 and the proximal chamber 134 in the stroke dependent damper assembly 66 along flow path 139. The second piston assembly 130 includes a second compression valve 140 and a second rebound valve 142, which together form a second valve assembly 140, 142 that controls fluid flow between the proximal and intermediary chambers 134, 136.

The piston 110 of the second piston assembly 130 has one or more compression passages 144 and one or more rebound passages 146. The second compression valve 140 includes a compression disc stack 148 that is mounted to the piston 110 of the second piston assembly 130 and is positioned longitudinally between the piston 110 and the proximal end 100 of the stroke dependent damper assembly 66. Flow through the compression passages 144 in the piston 110 of the second piston assembly 130 is controlled by deflection of the compression disc stack 148. The second rebound valve 142 includes a rebound disc stack 150 that is mounted to the piston 110 of the second piston assembly 130 and is positioned longitudinally between the piston 110 and the piston retainer 137. Flow through the rebound passages 146 in the piston 110 of the second piston assembly 130 is controlled by deflection of the rebound disc stack 150. The compression disc stack 148 and the rebound disc stack 150 are attached to the piston 110 with a rivet 151.

The piston 110 of the second piston assembly 130 includes a skirt 152 that extends longitudinally towards the proximal end 100 of the stroke dependent damper assembly 66 and annularly about the compression disc stack 148. At the proximal end 100 of the stroke dependent damper assembly 66, the damper housing 104 includes one of more bleed ports 154. The bleed ports 154 are open to the second working chamber 46. An orifice disc 156 with at least one notch 158 is positioned longitudinally between the base portion 106 of the damper housing 104 and skirt 152 and the skirt 152 includes an outer chamfer 160 such that a bleed flow path 162 is created via the notch 158 in the orifice disc 156 and the outer chamfer 160 in the skirt 152 that allows a limited amount of hydraulic fluid to flow directly between the second working chamber 46 and the proximal chamber 134 of the stroke dependent damper assembly 66.

The piston retainer 137 of the stroke dependent damper assembly 66 includes an annular ring portion 166 that abuts an inner face 132 of the extension portion 108 of the damper housing 104 and a flange portion 168 that extends radially inwardly from the flange portion 168. The annular ring portion 166 is disposed in contact with and extends longitudinally between the annular wall 122 of the end cap 120 and the skirt 152 of the piston 110 such that the second piston assembly 130 is clamped between the piston retainer 137 and the orifice disc 156. As a result, the piston retainer 137 holds the second piston assembly 130 in place and prevents the second piston assembly 130 from moving longitudinally relative to the damper housing 104.

The piston retainer 137 includes a first through-bore 172 that extends entirely through the flange portion 168 of the piston retainer 137. The first through-bore 172 in the piston retainer 137 is open to and is disposed in fluid communication with the intermediary chamber 136. The end wall 118 of the end cap 120 includes a second through-bore 174. The second through-bore 174 extends entirely through the end wall 118 of the end cap 120. The second through-bore 174 is open to and is disposed in fluid communication with the second working chamber 46. In the illustrated example, the first and second through-bores 172, 174 are cylindrical in shape; however, other shapes are considered to be within the scope of the subject disclosure.

The end cap 120 and the piston retainer 137 cooperate to define a disc chamber 176 inside the stroke dependent damper assembly 66. The piston retainer 137 includes a proximal chamber surface 178 and the end cap 120 includes a distal chamber surface 180 opposite the proximal chamber surface 178 of the piston retainer 137. The disc chamber 176 is bounded by the proximal chamber surface 178 of the piston retainer 137, the distal chamber surface 180 of the end cap 120, and a portion of the annular wall 122 of the end cap 120. The proximal chamber surface 178 of the piston retainer 137 includes a proximal tapered cavity 182 in the form of a depression having a concave bowl-like shape that gradually narrows moving longitudinally towards the first through-bore 172 in the flange portion 168 of the piston retainer 137. The distal chamber surface 180 of the end cap 120 includes a distal tapered cavity 184 in the form of a depression having a concave bowl-like shape that gradually narrows moving longitudinally towards the second through-bore 174 in the end wall 118 of the end cap 120. The proximal chamber surface 178 of the piston retainer 137 includes a proximal disc seat 186 that extends radially between the proximal tapered cavity 182 and the annular wall 122 of the end cap 120. The distal chamber surface 180 of the end cap 120 includes a distal disc seat 188 that extends radially between the distal tapered cavity 184 and the annular wall 122 of the end cap 120. Although other configurations are possible, in the example illustrated in FIGS. 3 and 5-7, the proximal and distal tapered cavities 182, 184 give the disc chamber 176 an egg-like shape.

A flexible floating disc 190 is slidably received in the disc chamber 176. The flexible floating disc 190 can move (i.e., float or slide) within the disc chamber 176 along the longitudinal axis 35 between a first position (FIG. 5) where the flexible floating disc 190 is in contact with the proximal disc seat 186 and a second position (FIG. 6) where the flexible floating disc 190 is in contact with the distal disc seat 188. The flexible floating disc 190 is unbiased and free floating in the disc chamber 176, meaning that there are no biasing members that apply a biasing force to the flexible floating disc 190. The flexible floating disc 190 lacks fluid passageways such that the flexible floating disc 190 divides the disc chamber 176 into a proximal portion 192 and a distal portion 194. However, it should be appreciated that the flexible floating disc 190 may or may not seal against the annular wall 122 of the end cap 120. In embodiments where the flexible floating disc 190 is smaller in diameter than an inner diameter of the annular wall 122 of the end cap 120, fluid is free to flow around the outside of the flexible floating disc 190 when the flexible floating disc 190 is in an intermediate position (FIG. 3) between the first position (FIG. 5) and the second position (FIG. 6).

The flexible floating disc 190 is made of a resilient material (i.e., a material that undergoes elastic deformation when flexed, as will be described more fully below). The flexible floating disc 190 is adapted to flex (i.e., bend or deflect) into the proximal tapered cavity 182 in the piston retainer 137 after making contact with the proximal chamber surface 178 when the flexible floating disc 190 is in the first position. Similarly, the flexible floating disc 190 is adapted to flex (i.e., bend or deflect) into the distal tapered cavity 184 after making contact with the distal chamber surface 180 when the flexible floating disc 190 is in the second position. The pressure differential across the flexible floating disc 190 (i.e., the pressure difference between the fluid in the proximal and distal portions 192, 194 of the disc chamber 176) causes the flexible floating disc 190 to move to the first and second positions and ultimately flex into the proximal tapered cavity 182 or the distal tapered cavity 184. FIG. 7 illustrates an example where the flexible floating disc 190 has flexed fully into the distal tapered cavity 184 in the end cap 120 during a long rebound stroke of the shock absorber 20. It should be appreciated that the opposite occurs (i.e., the flexible floating disc 190 flexes fully into the proximal tapered cavity 182 of the piston retainer 137) during long compression strokes of the shock absorber 20.

Although other configurations are possible, in the illustrated embodiment, the resilient material forming the flexible floating disc 190 has a stiffness that permits the flexible floating disc 190 to assume the shape of the proximal and distal chamber surfaces 178, 180 when the pressure differential between the proximal and distal portions 192, 194 of the disc chamber 176 exceeds a predetermined value ranging from 15 to 45 bar of pressure. Because the flexible floating disc 190 can assume the shape of the proximal and distal chamber surfaces 178, 180, it is fully supported by one of the proximal and distal chamber surfaces 178, 180 when the pressure differential between the proximal and distal portions 192, 194 of the disc chamber 176 is high. This increases the durability of the flexible floating disc 190 by reducing the internal stresses on the resilient material when the flexible floating disc 190 is fully flexed into the proximal chamber surface 178 or the distal chamber surface 180 at high pressure differentials. The resilient material of the flexible floating disc 190 may be selected from a wide variety of different materials. In one example, the flexible floating disc 190 may be a polyurethane material available from Trelleborg Group under the tradename Zurcon® Z25, which has a hardness of 95 (Shore A) and an elastic modulus of 2,030 pounds per square inch (psi).

In the illustrated embodiment, the flexible floating disc 190 is cylindrical, has a rectangular profile, a thickness 196 ranging from 2 to 8 millimeters (mm), and a diameter 198 of approximately 28 millimeters (mm). Each of the proximal and distal tapered cavities 182, 184 has a depth 200 of 9 millimeters (mm) and the proximal and distal disc seats 186, 188 are longitudinally spaced apart by a gap 201 ranging from 6 to 10 millimeters (mm). In the embodiment where the end cap 120 screws into the damper housing 104, the gap 201 is adjustable by rotating the end cap 120 relative to the damper housing 104. Depending on the gap 201 and the thickness 196 of the flexible floating disc 190, the total travel distance of the flexible floating disc 190 between the first and second positions ranges from 1 to 5 millimeters (mm). In the illustrated embodiment, the proximal and distal tapered cavities 182, 184 have complementary, mirror-image shapes; however, it should be appreciated that other configurations are possible where the proximal and distal tapered cavities 182, 184 have different shapes and/or dimensions.

The shock absorber 20 operates as a multi-stage hydraulic damper, which provides damping that varies according to stroke length. Soft damping is provided for small strokes and firm damping is provided for large strokes. When the shock absorber 20 undergoes a small stroke, the flexible floating disc 190 remains in an intermediate position (FIG. 3), where the flexible floating disc 190 is longitudinally spaced from the proximal and distal disc seats 186, 188. Hydraulic fluid can flow into and out of the proximal portion 192 of the disc chamber 176 through the first through-bore 172 in the piston retainer 137 and hydraulic fluid can flow into and out of the distal portion 194 of the disc chamber 176 through the second through-bore 174 in the end cap 120. The flow of hydraulic fluid into and out of the proximal and distal portions 192, 194 of the disc chamber 176 causes small longitudinal movements in the flexible floating disc 190, which results in fluid flow through the second valve assembly 140, 142 along flow paths 202, 204 depending on whether the shock absorber 20 is in compression or rebound. The hydraulic fluid also flows through the first valve assembly 62, 64, 65 during small strokes along flow paths 82, 92 depending on whether the shock absorber 20 is in compression or rebound. The two separate fluid flows through the first valve assembly 62, 64, 65 and the second valve assembly 140, 142 provide soft damping. In other words, the first valve assembly 62, 64, 65 and the second valve assembly 140, 142 work in parallel with each other during small strokes. When the shock absorber 20 undergoes a large stroke, the flow of hydraulic fluid through the second valve assembly 140, 142 is progressively reduced as the flexible floating disc 190 makes contact with the proximal disc seat 186 or the distal disc seat 188 and begins to flex into the proximal tapered cavity 182 or the distal tapered cavity 184. In other words, as the longitudinal movement of the flexible floating disc 190 slows, fluid flow through the second valve assembly 140, 142 is reduced, which results in firm damping during large strokes.

Referring to FIGS. 3 and 5, during a compression stroke, hydraulic fluid in the second working chamber 46 is forced into the first working chamber 44 through the first valve assembly 62, 64, 65 overcoming the load required to deflect the compression valve plates 78, which opens the compression flow passage 74 in the piston body 60 (arrow 82). Hydraulic fluid in the second working chamber 46 also flows through the second through-bore 174 in the end cap 120 and into the distal portion 194 of the disc chamber 176. The hydraulic fluid in the distal portion 194 of the disc chamber 176 pushes the flexible floating disc 190 towards the proximal end 100 of the stroke dependent damper assembly 66. This forces the hydraulic fluid in the proximal portion 192 of the disc chamber 176 to flow through the first through-bore 172 in the piston retainer 137, into the intermediary chamber 136, through the compression passages 144 in the second valve assembly 140, 142, and into the proximal chamber 134 where the fluid then flows through the rod passage 138 and out into the first working chamber 44 (arrows 139, 202). The amount of fluid flow will be determined by the amount of pressure built up within the second working chamber 46 and the size of the first and second through-bores 172, 174. For small movements, fluid flows through both the first valve assembly 62, 64, 65 and the second valve assembly 140, 142. However, as shown in FIG. 5, as the length of the compression stroke increases, the flexible floating disc 190 will contact the proximal disc seat 186 when the flexible floating disc 190 reaches the first position. When this occurs, the flexible floating disc 190 seals against the proximal chamber surface 178 and begins flexing into the proximal tapered cavity 182 in the piston retainer 137. This gradually decreases fluid flow through the first through-bore 172 and thus fluid flow through the compression passages 144 in the second valve assembly 140, 142 to provide a smooth transition from initially soft damping to firm damping.

Referring to FIGS. 3 and 6, during a rebound stroke, hydraulic fluid in the first working chamber 44 is forced into the second working chamber 46 through the first valve assembly 62, 64, 65 overcoming the load required to deflect the rebound valve plates 86, which opens the rebound flow passage 76 in the piston body 60 (arrow 92). Hydraulic fluid in the first working chamber 44 flows through the rod passage 138 and into the proximal chamber 134 (arrow 139). As pressure builds, the hydraulic fluid in the proximal chamber 134 flows through the rebound passages 146 in the second valve assembly 140, 142, into the intermediary chamber 136, and then into the proximal portion 192 of the disc chamber 176 via the first through-bore 172 in the piston retainer 137. The hydraulic fluid in the proximal portion 192 of the disc chamber 176 pushes the flexible floating disc 190 towards the distal end 102 of the stroke dependent damper assembly 66. This forces the hydraulic fluid in the distal portion 194 of the disc chamber 176 to flow through the second through-bore 174 in the end cap 120 and out into the second working chamber 46 (arrow 208). The amount of fluid flow will be determined by the amount of pressure built up within the first working chamber 44 and the size of the first and second through-bores 172, 174. Thus, for small movements, fluid flows through both the first valve assembly 62, 64, 65 and the second valve assembly 140, 142. However, as shown in FIG. 6, as the length of the rebound stroke increases, the flexible floating disc 190 will contact the distal disc seat 188 when the flexible floating disc 190 reaches the second position. When this occurs, the flexible floating disc 190 seals against the distal chamber surface 180 and begins flexing into the distal tapered cavity 184 in the end cap 120. This gradually decreases fluid flow through the first through-bore 172 and thus fluid flow through the rebound passages 146 in the second valve assembly 140, 142 to provide a smooth transition from initially soft damping to firm damping.

Thus, shock absorber 20 provides a soft damping setting for small strokes and a firm damping setting for larger strokes. As explained above, the multi-force damping characteristics work both in compression and in rebound or extension. In addition, the multi-force damping depends on the length of the stroke, not the position of the first piston assembly 32. With reference to FIG. 7, the flexible floating disc 190 gradually dissipates energy as the flexible floating disc 190 flexes into the proximal tapered cavity 182 after reaching the first position and as the flexible floating disc 190 flexes into the distal tapered cavity 184 after reaching the second position (FIG. 7). The flexing of the flexible floating disc 190 provides a smooth transition between soft and firm damping to avoid unwanted switching noise. While the shock absorber 20 has been illustrated as a mono-tube shock absorber, it is within the scope of the present invention to incorporate the stroke dependent damper assembly 66 into a dual-tube shock absorber if desired.

In FIGS. 4 and 8-10, an alternative stroke dependent damper assembly 66' is illustrated. The stroke dependent damper assembly 66' illustrated in FIGS. 4 and 8-10 is the same as the stroke dependent damper assembly 66 illustrated in FIGS. 3 and 5-7 except as noted below. In accordance with this embodiment, the stroke dependent damper assembly 66' includes a disc chamber 176' that has a different shape. The disc chamber 176' includes proximal and distal chamber surfaces 178', 180' with proximal and distal tapered cavities 182', 184', respectively. The proximal chamber surface 178' is defined by piston retainer 137' and the distal chamber surface 180' is defined by end cap 120'. The proximal chamber surface 178' and the distal chamber surface 180' each has a conical, funnel-like shape. Although a wide variety of different geometries are possible, in the illustrated embodiment, the proximal and distal chamber surfaces 178', 180' slope radially inward at an angle 210 that ranges from 47.5 to 62.5 degrees relative to the longitudinal axis 35. This gives the V-shaped profile of the proximal and distal tapered cavities 182', 184' an angular span 212 that ranges from 95 to 125 degrees.

The proximal chamber surface 178' includes a first plurality of holes 214 that extend through the piston retainer 137' to communicate with the intermediary chamber 136. The first plurality of holes 214 are arranged at a plurality of different longitudinal positions 216 along the proximal chamber surface 178' relative to the proximal disc seat 186 such that the flexible floating disc 190 sequentially closes off the holes 214 in the first plurality of holes 214 as the flexible floating disc 190 flexes into the proximal tapered cavity 182' after making contact with the proximal disc seat 186 in the first position (FIG. 8). Similarly, the distal chamber surface 180' includes a second plurality of holes 218 that extend through the end cap 120' to communicate with the second working chamber 46. The second plurality of holes 218 are arranged at a plurality of different longitudinal positions 220 relative to the distal disc seat 188 such that the flexible floating disc 190 sequentially closes off the holes 218 in the second plurality of holes 218 as the flexible floating disc 190 flexes into the distal tapered cavity 184' after making contact with the distal disc seat 188 in the second position (FIG. 9). Although other configurations are possible, in the illustrated embodiment, the first plurality of holes 214 are arranged in a spiraling (i.e., helical) pattern on the proximal chamber surface 178' and the second plurality of holes 218 are arranged in a spiraling (i.e., helical) pattern on the distal chamber surface 180'.

The number and size of the holes 214, 218 in the first plurality of holes 214 and the second plurality of holes 218 can vary depending on the application. In the example illustrated, each hole 214, 218 in the first plurality of holes 214 and the second plurality of holes 218 has a hole diameter 222 of 3.4 millimeters (mm). In accordance with the embodiment shown, the first plurality of holes 214 are configured to have a combined cross-sectional area that equals a cross-sectional area of the rod passage 138. The same is true for the second plurality of holes 218, which have a combined cross-sectional area that equals a cross-sectional area of the rod passage 138. This means that the volume flowrate of the fluid passing through the first plurality of holes 214 and the second plurality of holes 218 is capable of equaling the volume flowrate of the fluid passing through the rod passage 138.

Figure 4:
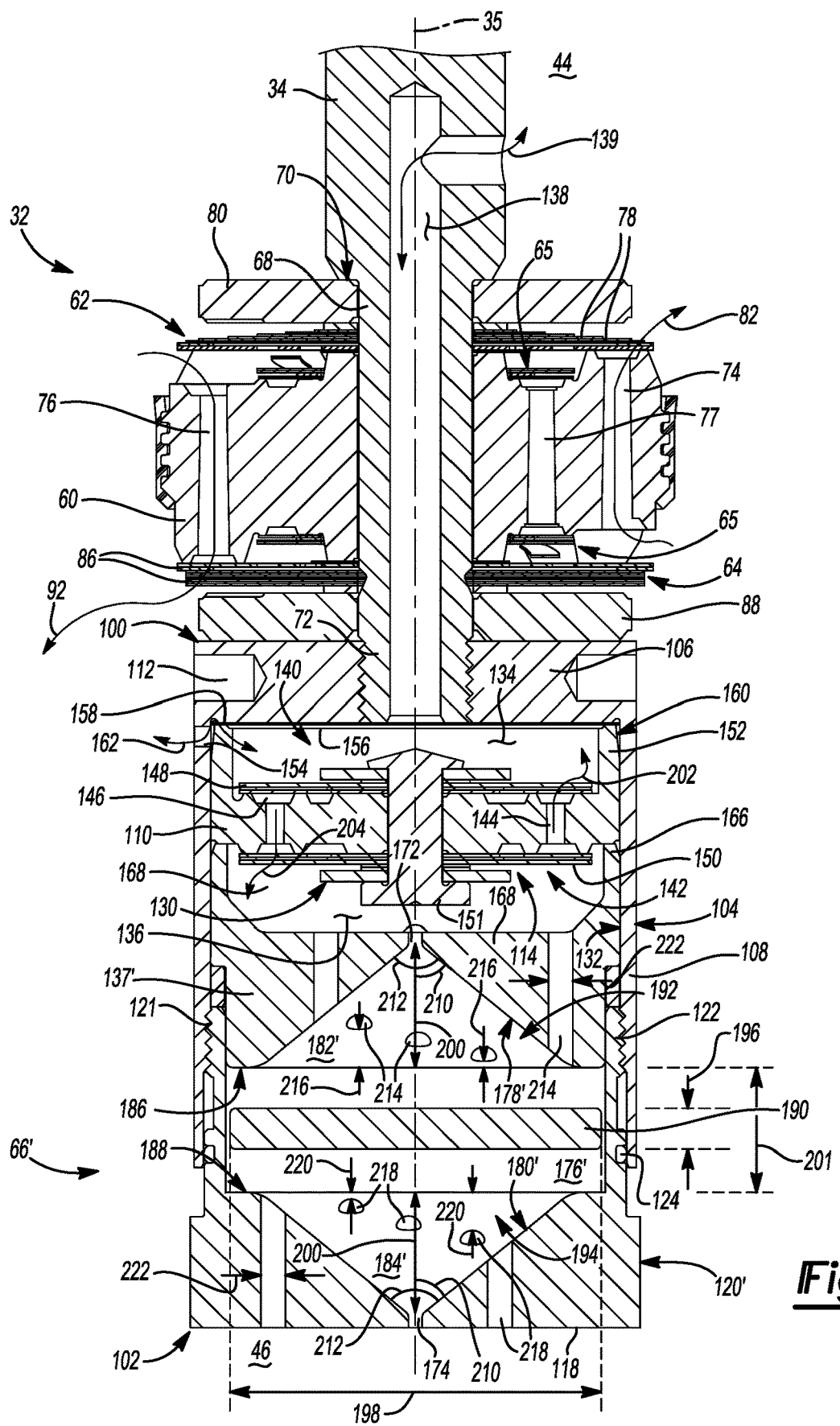
FIG. 4 is a side cross-sectional view depicting the piston assembly of the shock absorber shown in FIG. 2 and a different stroke dependent damper assembly constructed in accordance with the teachings of the present disclosure.

Referring to FIGS. 4 and 8, during a compression stroke, hydraulic fluid in the second working chamber 46 is forced into the first working chamber 44 through the first valve assembly 62, 64, 65 overcoming the load required to deflect the compression valve plates 78, which opens the compression flow passage 74 in the piston body 60 (arrow 82). Hydraulic fluid in the second working chamber 46 also flows through the second through-bore 174 and the second plurality of holes 218 in the end cap 120' and into the distal portion 194 of the disc chamber 176'. The hydraulic fluid in the distal portion 194 of the disc chamber 176' pushes the flexible floating piston 190 towards the proximal end 100 of the stroke dependent damper assembly 66'. This forces the hydraulic fluid in the proximal portion 192 of the disc chamber 176' to flow through the first through-bore 172 and the first plurality of holes 214 in the piston retainer 137', into the intermediary chamber 136, through the compression passages 144 in the second valve assembly 140, 142, and into the proximal chamber 134 where the fluid then flows through the rod passage 138 and out into the first working chamber 44 (arrows 139, 202). The amount of fluid flow will be determined by the amount of pressure built up within the second working chamber 46 and the size of the first and second through-bores 172, 174 and the size of the first and second pluralities of holes 214, 218. For small movements, fluid flows through both the first valve assembly 62, 64, 65 and the second valve assembly 140, 142. However, as shown in FIG. 8, as the length of the compression stroke increases, the flexible floating disc 190 will contact the proximal disc seat 186 when the flexible floating disc 190 reaches the first position. When this occurs, the flexible floating disc 190 seals against the proximal chamber surface 178' and begins flexing into the proximal tapered cavity 182' in the piston retainer 137'. This gradually and sequentially closes off the holes 214 in the first plurality of holes 214 and thus decreases fluid flow into the intermediary chamber 136 and out through the compression passages 144 in the second valve assembly 140, 142 to provide a smooth transition from initially soft damping to firm damping.

Referring to FIGS. 4 and 9, during a rebound stroke, hydraulic fluid in the first working chamber 44 is forced into the second working chamber 46 through the first valve assembly 62, 64, 65 overcoming the load required to deflect the rebound valve plates 86, which opens the rebound flow passage 76 in the piston body 60 (arrow 92). Hydraulic fluid in the first working chamber 44 flows through the rod passage 138 and into the proximal chamber 134 (arrow 139). As pressure builds, the hydraulic fluid in the proximal chamber 134 flows through the rebound passages 146 in the second valve assembly 140, 142, into the intermediary chamber 136, and then into the proximal portion 192 of the disc chamber 176' via the first through-bore 172 and the first plurality of holes 214 in the piston retainer 137'. The hydraulic fluid in the proximal portion 192 of the disc chamber 176' pushes the flexible floating disc 190 towards the distal end 102 of the stroke dependent damper assembly 66'. This forces the hydraulic fluid in the distal portion 194 of the disc chamber 176' to flow through the second through-bore 174 and the second plurality of holes 218 in the end cap 120' and out into the second working chamber 46 (arrow 208). The amount of fluid flow will be determined by the amount of pressure built up within the first working chamber 44 and the size of the first and second through-bores 172, 174 and the first and second pluralities of holes 214, 218. Thus, for small movements, fluid flows through both the first valve assembly 62, 64, 65 and the second valve assembly 140, 142. However, as shown in FIG. 9, as the length of the rebound stroke increases, the flexible floating disc 190 will contact the distal disc seat 188 when the flexible floating disc 190 reaches the second position. When this occurs, the flexible floating disc 190 seals against the distal chamber surface 180' and begins flexing into the distal tapered cavity 184' in the end cap 120'. This gradually and sequentially closes off the holes 218 in the second plurality of holes 218 and thus decreases fluid flow out of the disc chamber 176', which results in less fluid flow through the rebound passages 146 in the second valve assembly 140, 142 to provide a smooth transition from initially soft damping to firm damping.

The flexible floating piston 190 gradually dissipates energy as the flexible floating piston 190 flexes into the proximal tapered cavity 182' after reaching the first position and dissipates energy as the flexible floating piston 190 flexes into the distal tapered cavity 184' after reaching the second position (FIG. 10). The flexing of the flexible floating piston 190 provides a smooth transition between soft and firm damping to avoid unwanted switching noise. In addition, when the flexible floating disc 190 approaches the first and second positions, the speed of the flexible floating disc 190 is hydraulically controlled to slow down gradually as the flexible floating disc 190 begins to sequentially close off the first plurality of holes 214 or the second plurality of holes 218, which restricts fluid flow into or out of the disc chamber 176' and creates a soft, hydraulic stop for the flexible floating disc 190. This reduces pressure waves inside the shock absorber 20 that would otherwise be generated if a rigid floating piston and/or a rectangular chamber (see FIGS. 13-15) were used. Noise, vibration, and harshness is therefore improved because such pressure waves vibrate the piston rod 34 and cause unwanted noise. In addition, because the first and second pluralities of holes 214, 218 dissipate energy and slow down the longitudinal movement of the flexible floating disc 190 when the flexible floating disc 190 approaches the first and second positions, less room inside in the disc chamber 176' is require to allow the flexible floating disc 190 to flex/deflect. As a result, the proximal and distal tapered cavities 182', 184' can be made shallower, which decreases the overall length of the stroke dependent damper assembly 66'. This is particularly advantageous, because the length of internal shock absorber components, such as the stroke dependent damper assembly 66', limits the travel distance of the shock absorber 20 (i.e., the maximum distance the piston rod 34 can retract and extend into and out of the pressure tube 30 during compression and rebound strokes). In other words, the dead length (i.e., the length between the internal piston assembly 130 and the second end 55 of the pressure tube 30) can be minimized in this embodiment by making the proximal and distal tapered cavities 182', 184' shallower without any associated decrease in noise reduction performance. By reducing the overall length of the stroke dependent damper assembly 66', travel length can be increased in the shock absorber 20 for any given shock absorber length.

Figure 11:
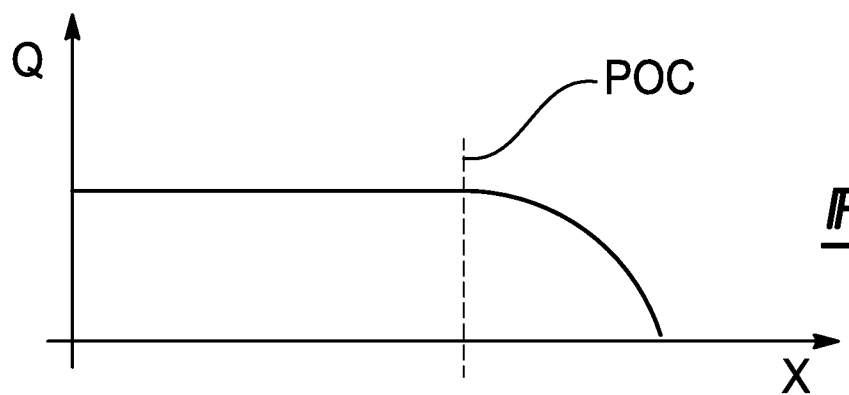
FIG. 11 is a plot illustrating fluid flowrate through the exemplary stroke dependent damper assemblies shown in FIGS. 3 and 4 versus position of the flexible floating disc.

FIG. 11 is a plot illustrating fluid flowrate Q through the exemplary stroke dependent damper assemblies 66, 66' shown in FIGS. 3 and 4 versus position X of the flexible floating disc 190. The fluid flowrate Q into and out of the disc chamber 176, 176' is plotted along the y-axis (i.e., the vertical axis) and the position X of the flexible floating disc 190 is plotted along the x-axis (i.e., the horizontal axis). The plot illustrates the flow profile when the flexible floating disc 190 moves from the first position to the second portion during a rebound stroke of the shock absorber 20. Accordingly, the position X of the flexible floating disc 190 equals zero when the flexible floating disc 190 is at the first position. Dashed line POC illustrates the point of contact where the flexible floating disc 190 contacts the distal disc seat 188 (i.e., the second position). As can be seen in the plot, the fluid flowrate Q remains substantially constant as the flexible floating disc 190 moves from the first position to the second position. After the point of contact POC, the fluid flowrate Q then gradually decreases as the flexible floating disc 190 flexes into the distal tapered cavity 184, 184'.

Figure 12:
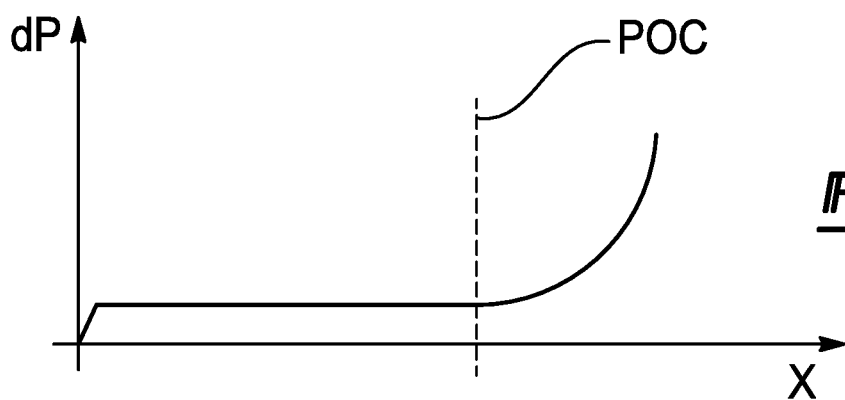
FIG. 12 is a plot illustrating pressure difference across the flexible floating disc shown in FIGS. 3 and 4 versus the position of the flexible floating disc.

FIG. 12 is a plot illustrating pressure difference dP across the flexible floating disc 190 shown in FIGS. 3 and 4 versus the position X of the flexible floating disc 190. The pressure difference dP between the proximal and distal portions 190, 192 of the disc chamber 176, 176' is plotted along the y-axis (i.e., the vertical axis) and the position X of the flexible floating disc 190 is plotted along the x-axis (i.e., the horizontal axis). The plot illustrates the pressure profile when the flexible floating disc 190 moves from the first position to the second portion during a rebound stroke of the shock absorber 20. Accordingly, the position X of the flexible floating disc 190 equals zero when the flexible floating disc 190 is at the first position. Dashed line POC illustrates the point of contact where the flexible floating disc 190 contacts the distal disc seat 188 (i.e., the second position). As can be seen in the plot, the pressure differential dP remains substantially constant as the flexible floating disc 190 moves from the first position to the second position. After the point of contact POC, the pressure differential dP gradually increases, which operates to progressively flex the flexible floating disc 190 further into the distal tapered cavity 184, 184'.

Figure 13:
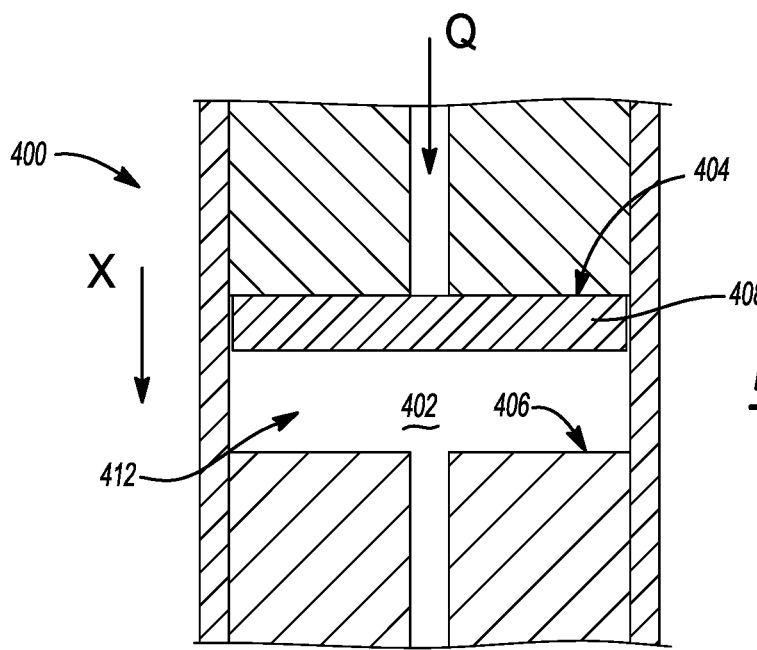
FIG. 13 is a side cross-sectional view depicting the piston assembly of the shock absorber shown in FIG. 2 and a different stroke dependent damper assembly that includes a floating piston, which is illustrated abutting a proximal planar wall of the stroke dependent damper assembly.

Referring to FIGS. 13-15, a different stroke dependent damper assembly 400 is illustrated. The stroke dependent damper assembly 400 includes a piston chamber 402 with proximal and distal planar walls 404, 406 that give the piston chamber 402 a rectangular shaped profile. A floating piston 408 is slidingly disposed in the piston chamber 402 for movement between a first position (FIG. 13) and a second position (FIG. 15). The floating piston 408 does not include any fluid flow passages such that the floating piston 408 divides the piston chamber 402 into proximal and distal portions 410, 412. FIGS. 13-15 illustrate the movement of the floating piston 408 during a rebound stroke. In FIG. 13, the floating piston 408 is illustrated in the first position, where the floating piston 408 abuts the proximal planar wall 404 of the piston chamber 402. In FIG. 14, the floating piston 408 is illustrated in an intermediary position where the floating piston 408 is longitudinally spaced from the proximal and distal planar walls 404, 406. The flowrate Q of the fluid entering the proximal portion 410 of the piston chamber 402 forces the floating piston 408 to slide towards the distal planar wall 406. In FIG. 15, the floating piston 408 is illustrated in the second position, where the floating piston 408 abuts the distal planar wall 406 of the piston chamber 402, which acts as a hard (i.e., abrupt) stop for the floating piston 408. The reverse is true during compression strokes.

FIG. 16 is a plot illustrating fluid flowrate Q through the stroke dependent damper assembly 400 shown in FIGS. 13-15 versus position X of the floating piston 408. The fluid flowrate Q into and out of the piston chamber 402 is plotted along the y-axis (i.e., the vertical axis) and the position X of the floating piston 408 is plotted along the x-axis (i.e., the horizontal axis). The plot illustrates the flow profile when the floating piston 408 moves from the first position to the second portion during a rebound stroke. Accordingly, the position X of the floating piston 408 equals zero when the floating piston 408 is at the first position. Dashed line POC illustrates the point of contact where the floating piston 408 contacts the distal planar wall 406 (i.e., the second position). As can be seen in the plot, the fluid flowrate Q remains substantially constant as the floating position 408 moves from the first position to the second position. After the point of contact POC, the fluid flowrate Q drops abruptly as the floating piston 408 hits the distal planar wall 406. This abrupt drop in fluid flowrate Q creates a pressure pulse or spike in the piston chamber 402 (see FIG. 17). The exemplary stroke dependent damper assemblies 66, 66' disclosed herein are designed to avoid this pressure pulse or spike.

FIG. 17 is a plot illustrating pressure difference dP across the floating piston 408 shown in FIGS. 13-15 versus the position X of the floating piston 408. The pressure difference dP between the proximal and distal portions 410, 412 of the piston chamber 402 is plotted along the y-axis (i.e., the vertical axis) and the position X of the floating piston 408 is plotted along the x-axis (i.e., the horizontal axis). The plot illustrates the pressure profile when the floating piston 408 moves from the first position to the second portion during a rebound stroke. Accordingly, the position X of the floating piston 408 equals zero when the floating piston 408 is at the first position. Dashed line POC illustrates the point of contact where the floating piston 408 contacts the distal planar wall 406 (i.e., the second position). As can be seen in the plot, the pressure differential dP remains substantially constant as the floating piston 408 moves from the first position to the second position. After the point of contact POC, the pressure differential dP rapidly increases as a pressure pulse or spike, which can cause rapid changes or spikes in the acceleration of the piston rod 34. These spikes in the acceleration of the piston rod 34 can induce unwanted noise in the vehicle 10. Comparing FIGS. 11-12 to FIGS. 16-17, it can be seen that the use of a flexible floating disc 190 that can flex into proximal and distal tapered cavities 182, 182', 184, 184' at opposing longitudinal ends of the disc chamber 176, 176' results in a much more gradual decrease in flowrate Q and a much more gradual increase in pressure differential dP after the flexible floating disc 190 reaches the second position during a rebound stroke. The same is true for when the flexible floating disc 190 reaches the first position during a compression stroke. As a result, the exemplary stroke dependent damper assemblies 66, 66' disclosed herein reduce unwanted noise, vibration, and harshness (NVH).

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the subject disclosure, and all such modifications are intended to be included within the scope of the subject disclosure.

What is claimed is:

1. A damper system for a vehicle, comprising:
    a pressure tube containing a hydraulic fluid;
    a piston rod extending within the pressure tube along a longitudinal axis;
    a first piston assembly slidably fitted in the pressure tube for movement along the longitudinal axis, the first piston assembly coupled to the piston rod and separating the pressure tube into a first working chamber and a second working chamber, the first piston assembly including a first valve assembly that controls fluid flow between the first working chamber and the second working chamber; and
    a damper assembly including a damper housing coupled to the piston rod, a disc chamber, and a flexible floating disc slidably received in the disc chamber, the flexible floating disc being unbiased and free floating in the disc chamber for movement between a first position and a second position, the disc chamber bounded by a proximal chamber surface defining a proximal tapered cavity and a distal chamber surface defining a distal tapered cavity, the flexible floating disc being made of a resilient material such that the flexible floating disc is adapted to flex into the proximal tapered cavity upon making contact with the proximal chamber surface when the flexible floating disc is in the first position and is adapted to flex into the distal tapered cavity upon making contact with the distal chamber surface when the flexible floating disc is in the second position.

2. The damper system of claim 1, wherein the flexible floating disc lacks fluid passageways such that the flexible floating disc divides the disc chamber into a proximal portion and a distal portion.

3. The damper system of claim 2, wherein the damper assembly includes an internal cavity inside the damper housing that contains a second piston assembly, the second piston assembly dividing the internal cavity into a proximal chamber and an intermediary chamber, the intermediary chamber of the internal cavity being disposed in fluid communication with the proximal portion of the disc chamber.

4. The damper system of claim 3, wherein the second piston assembly includes a second valve assembly that controls fluid flow between the proximal and intermediary chambers.

5. The damper system of claim 4, wherein the piston rod includes a rod passage that extends between the first working chamber and the proximal chamber.

6. The damper system of claim 2, wherein each of the proximal and distal chamber surfaces has a concave bowl-like shape.

7. The damper system of claim 6, wherein the resilient material forming the flexible floating disc has a stiffness that permits the flexible floating disc to assume the shape of the proximal and distal chamber surfaces when a pressure differential between the proximal and distal portions of the disc chamber exceeds a predetermined value ranging from 15 to 45 bar of pressure.

8. The damper system of claim 2, wherein each of the proximal and distal chamber surfaces has a conical funnel-like shape.

9. The damper system of claim 8, wherein the proximal and distal chamber surfaces slope radially inward at an angle ranging from 47.5 to 62.5 degrees relative to the longitudinal axis.

10. The damper system of claim 2, wherein the proximal chamber surface includes a first plurality of holes for communicating fluid into and out of the proximal portion of the disc chamber that are arranged at a plurality of different longitudinal positions such that the flexible floating disc sequentially closes off the holes in the first plurality of holes as the flexible floating disc flexes into the proximal tapered cavity and wherein the distal chamber surface includes a second plurality of holes for communicating fluid into and out of the proximal portion of the disc chamber that are arranged at a plurality of different longitudinal positions such that the flexible floating disc sequentially closes off the holes in the second plurality of holes as the flexible floating disc flexes into the distal tapered cavity.

11. The damper system of claim 1, wherein the flexible floating disc is cylindrical and has a rectangular profile.

12. The damper system of claim 11, wherein the flexible floating disc has a thickness ranging from 2 to 8 millimeters (mm).

13. The damper system of claim 1, wherein the floating disc is axially translatable between the first position and the second position.

14. A damper system for a vehicle, comprising:
    a pressure tube containing a hydraulic fluid;
    a piston rod extending within the pressure tube along a longitudinal axis;
    a first piston assembly slidably fitted in the pressure tube for movement along the longitudinal axis, the first piston assembly coupled to the piston rod and separating the pressure tube into a first working chamber and a second working chamber, the first piston assembly including a first valve assembly that controls fluid flow between the first working chamber and the second working chamber; and
    a damper assembly including a damper housing coupled to the piston rod, a disc chamber bounded by a proximal chamber surface and a distal chamber surface, and a floating disc slidably received in the disc chamber, the floating disc being unbiased and free floating in the disc chamber for movement between a first position where the floating disc contacts the proximal chamber surface and a second position where the floating disc contacts the distal chamber surface, the disc chamber including a plurality of holes for communicating fluid into and out of the disc chamber that are arranged at a plurality of different longitudinal positions such that the floating disc sequentially closes off the holes in the disc chamber as the floating disc approaches the first and second positions to restrict fluid flow and slow down longitudinal movement of the floating disc.

15. The damper system of claim 14, wherein the floating disc lacks fluid passageways such that the flexible floating disc divides the disc chamber into a proximal portion and a distal portion.

16. The damper system of claim 15, wherein the damper assembly includes an internal cavity inside the damper housing that contains a second piston assembly, the second piston assembly dividing the internal cavity into a proximal chamber and an intermediary chamber, the intermediary chamber of the internal cavity being disposed in fluid communication with the proximal portion of the disc chamber.

17. The damper system of claim 16, wherein the second piston assembly includes a second valve assembly that controls fluid flow between the proximal and intermediary chambers.

18. The damper system of claim 17, wherein the piston rod includes a rod passage that extends between the first working chamber and the proximal chamber.

19. The damper system of claim 17, wherein the plurality of holes in the disc chamber including a first plurality of holes and a second plurality of holes, the first plurality of holes extending between the proximal chamber surface and the intermediary chamber and the second plurality of holes extending between the distal chamber surface and the second working chamber.

20. A damper system including a damper assembly for attachment to a piston rod of a vehicle shock absorber having first and second working chambers, the damper assembly comprising:

a damper housing having a proximal end configured to be coupled to the piston rod and a distal end opposite the proximal end;

an end cap coupled to the damper housing, the end cap having an end wall with a through-bore, the end cap and the damper housing cooperating to define an internal cavity;

an internal piston assembly positioned in the internal cavity of the damper housing such that a proximal chamber is defined in the internal cavity between the internal piston assembly and the proximal end of the damper housing;

a piston retainer positioned in the internal cavity of the damper housing longitudinally between the end cap and that internal piston assembly such that an intermediary chamber is defined in the internal cavity between the internal piston assembly and the piston retainer, the piston retainer holding the internal piston assembly in place such that the internal piston assembly does not move longitudinally within the damper housing;

a disc chamber disposed in fluid communication with the intermediary chamber, the disc chamber bounded by a proximal chamber surface positioned on the piston retainer and a distal chamber surface positioned on the end cap, the proximal chamber surface including a proximal tapered cavity and the distal chamber surface including a distal tapered cavity; and a flexible floating disc slidably received in the disc chamber, the flexible floating disc being unbiased and free floating in the disc chamber for movement between a first position and a second position, the flexible floating disc being made of a resilient material such that the flexible floating disc is adapted to flex into the proximal tapered cavity upon making contact with the proximal chamber surface when the flexible floating disc is in the first position and is adapted to flex into the distal tapered cavity upon making contact with the distal chamber surface when the flexible floating disc is in the second position.

21. The damper system of claim 20, wherein the proximal chamber surface includes a first plurality of holes that extend through the piston retainer and are arranged at a plurality of different longitudinal positions such that the flexible floating disc sequentially closes off the holes in the first plurality of holes as the flexible floating disc flexes into the proximal tapered cavity and wherein the distal chamber surface includes a second plurality of holes that extend through the end cap and are arranged at a plurality of different longitudinal positions such that the flexible floating disc sequentially closes off the holes in the second plurality of holes as the flexible floating disc flexes into the distal tapered cavity.

\* \* \* \* \*